R. D. SPELTS.
FARROWING PEN FOR SWINE.
APPLICATION FILED FEB. 17, 1910.
975,649.
Patented Nov. 15, 1910.
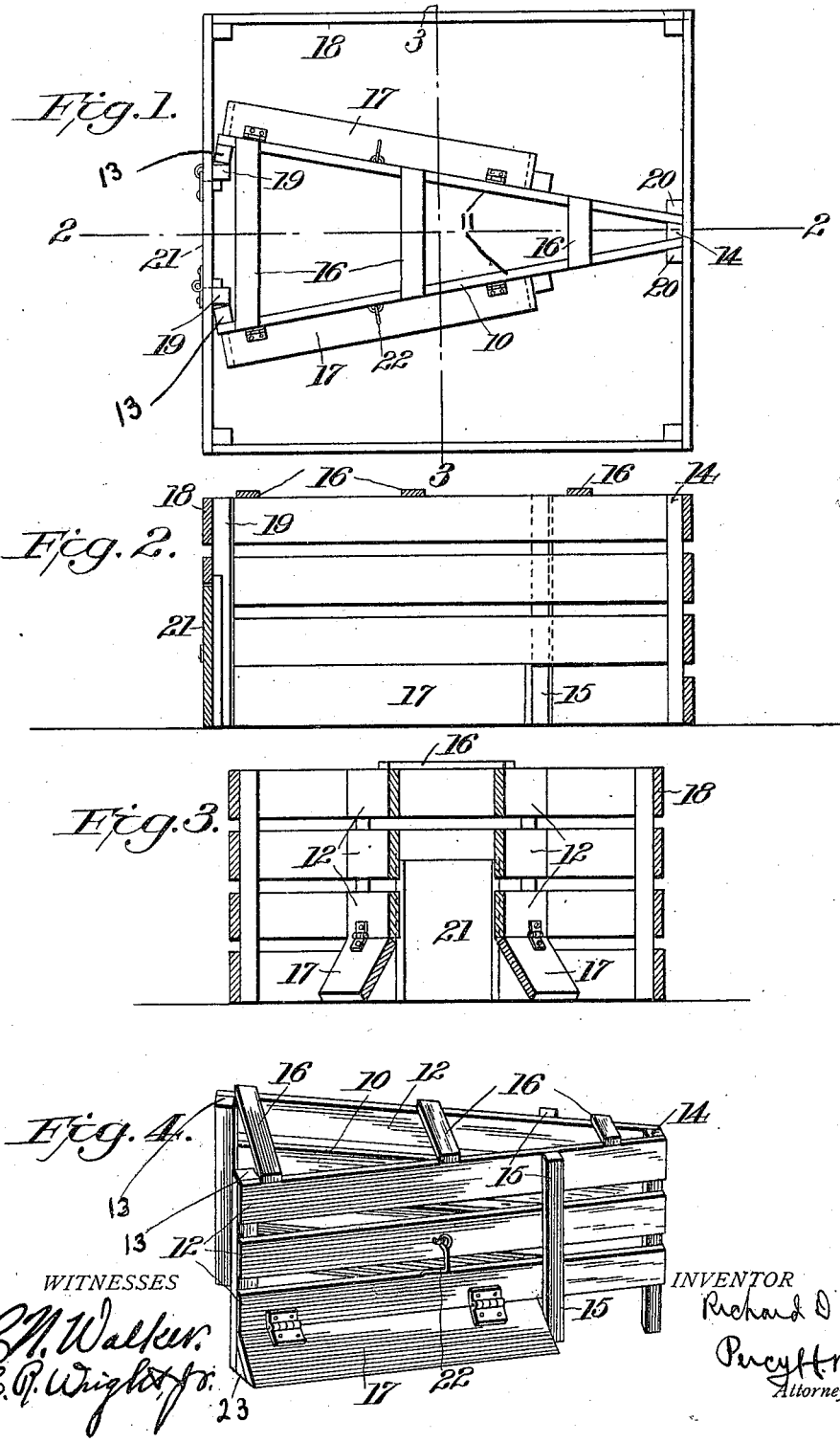

UNITED STATES PATENT OFFICE.

RICHARD D. SPELTS, OF LINCOLN, NEBRASKA.

FARROWING-PEN FOR SWINE.

975,649. Specification of Letters Patent. Patented Nov. 15, 1910.

Application filed February 17, 1910. Serial No. 544,476.

*To all whom it may concern:*

Be it known that I, RICHARD D. SPELTS, a citizen of the United States, residing at Lincoln, in the State of Nebraska, have invented certain new and useful Improvements in Farrowing-Pens for Swine; and I do hereby declare that the following is a full, clear, and exact description of the invention, which will enable others skilled in the art to which it appertains to make and use the same.

The object of my invention is to provide protection for the young pigs during farrowing, and until they get of sufficient size to be out of danger from overlying and trampling; and also permit of the sow being handled without danger to the attendant.

Another object is to provide a device of the character described which can readily be secured to and as easily detached from the ordinary pig pen; and it consists in the construction and arrangement of parts hereinafter fully set forth, and embodied in the claim.

Referring to the accompanying drawings, in which similar letters of reference indicate like parts in each of the several views, Figure 1 is a plan view of my improved stall secured within a pen. Fig. 2 is a sectional view taken on the line 2—2 Fig. 1. Fig. 3 is a sectional view taken on the line 3—3 Fig. 1, looking from the rear, and Fig. 4 is a side elevation view of my invention detached from the pen.

In carrying out my invention, I construct a skeleton frame or stall 10, comprising converging side members 11, which meet at their rear extremities forming a substantially wedge shaped structure. The side members 11 are constructed of boards 12 spaced apart and connected at their forward and rear ends respectively to posts 13 and 14. Suitable braces 15 and 16 are also provided. To protect the young pigs from the inclemencies of the weather and to provide a place where they may be free from danger of being trampled upon and killed by the mother sow, the bottom board of each side member 11 is slightly raised from the ground to enable the young pigs to pass therebeneath and has secured thereto hinged downwardly and outwardly inclined boards 17 extending from the forward posts 13 to the braces 15. Blocks 23 are provided to limit the inward movement of the said boards and a hook 22 is adapted to retain them in a horizontal position when desired.

As shown in Fig. 1 of the drawings the frame 10 is removably secured within the pen 18 by means of blocks or strips 19 and 20 and the open front end thereof is adapted to register with the usual door 21.

It will be readily understood that when the mother animal is confined within the frame, it will be impossible for her to reverse her position or even turn her head owing to the acute angle formed by the converging side walls 11, thus permitting an attendant to render necessary aid during the farrowing period without danger to himself.

From the foregoing it will be seen that I have provided a simple, inexpensive structure, adapted to be used in connection with the ordinary hog pen.

What I claim as new, and desire to secure by Letters Patent, is—

The combination with a hog pen provided with a door, of an inner skeleton frame comprising converging side members, hinged boards connected to said side members, means for supporting said hinged boards in an elevated position and means for supporting said boards in an outwardly inclined position; upright posts secured to the forward and rear extremities of said side members, blocks secured to the inner face of the front end of said pen on either side of said door, adapted to be engaged by the posts at the forward extremities of the side members and blocks secured to the inner face of the rear end of said pen adapted to engage the angled end of said frame, whereby said frame will be slidably retained within said pen.

RICHARD D. SPELTS.

Witnesses:
EDWARD SPRIGGS,
A. C. HERRICK.